(12) United States Patent
Sheppard et al.

(10) Patent No.: US 7,801,130 B2
(45) Date of Patent: Sep. 21, 2010

(54) METHODS, SYSTEMS AND COMPUTER PROGRAM PRODUCTS FOR INTEGRATING NETWORK TRAFFIC

(75) Inventors: Scott Sheppard, Decatur, GA (US); Roy Mongiovi, Tucker, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 709 days.

(21) Appl. No.: 11/700,311

(22) Filed: Jan. 31, 2007

(65) Prior Publication Data

US 2008/0181217 A1 Jul. 31, 2008

(51) Int. Cl.
*H04L 12/28* (2006.01)
(52) U.S. Cl. ...................... 370/389; 709/223
(58) Field of Classification Search .......... 370/241, 370/230, 466, 392, 401; 709/224, 223, 228, 709/102, 105, 236
See application file for complete search history.

(56) References Cited

U.S. PATENT DOCUMENTS

2007/0258372 A1* 11/2007 Nadeau et al. ............. 370/235
2007/0283194 A1* 12/2007 Villella et al. .............. 714/57
2008/0062891 A1* 3/2008 Van der Merwe et al. ... 370/254

* cited by examiner

*Primary Examiner*—Dang T Ton
*Assistant Examiner*—Nourali Mansoury
(74) *Attorney, Agent, or Firm*—Myers Bigel Sibley & Sajovec

(57) ABSTRACT

Methods, systems and computer program products for integrating data in a communications network received at provider (P) routers from provider edge (PE) routers having a plurality of different configurations are provided. Global collection and export parameters for the P routers are configured. A collector associated with the P routers is configured to maintain a netflow exported data table for the P routers based on the global collection and export parameters received from the P routers. P router text files are configured. The P router text files identify all P routers associated with the collector using Internet protocol (IP) addresses associated with each of the P routers. A destination PE router is located for a selected P router based on IP addresses in the P router text file associated with the selected P router such that the interface IP address of the selected P router is matched with the open shortest path first (OSPF) router identification of the destination PE router.

12 Claims, 3 Drawing Sheets

METHODS, SYSTEMS AND COMPUTER PROGRAM PRODUCTS FOR INTEGRATING NETWORK TRAFFIC

FIELD OF THE INVENTION

The present invention generally relates to communication networks and more particularly, to methods, systems and computer program products for integrating traffic in communication networks.

BACKGROUND OF THE INVENTION

Computer networks have grown increasingly complex with the use of distributed client/server applications, mixed platforms and multiple protocols all on a single physical backbone. The control of traffic on the networks is likewise moving from centralized information technology (IT) departments to distributed workgroups. The growing utilization of computer networks is not only causing a move to new, high-speed technologies, but is at the same time making the operation of computer networks more critical to day-to-day business operations.

The growth in complexity and dependence on computer networks heightens the need for network management tools to design, build and maintain computer networks. The mix of protocols and vendors of installed hardware on many computer networks generally increases the difficulty of accomplishing network management. This problem may arise in planning or designing changes to a network, monitoring performance of a network, and testing the impact on performance of different hardware and software being installed on a network. The acquisition of data from network components for analysis may also be problematic.

A computer network, such as an Internet Protocol (IP) architecture, may be described as including a hierarchy of Access, Edge, and Core. Access circuits generally connect to a customer or Customer Provided/Premise Equipment (CPE), which access circuits may be multiplexed, integrated, or aggregated to Edge routers. At the Edge, different protocols may be combined by a network carrier or provider depending on their architecture into Core protocols, such as Internet Protocol (IP) and/or Asynchronous Transfer Mode (ATM). In order to reduce the number and types of different routing and switching systems, a type of edge router device referred to as a Broadband Remote Access Server (BRAS) or Multi-Service Switching System (MSSS) may be used. A Multi-Service Edge (MSE) system may be used, which generally provides protocol conversion from Access protocols to one or more Core protocols.

Furthermore, with the advent of multi-protocol label switching (MPLS) in large IP networks, the need and the challenge of making and acting on measurements regarding the traffic on the routers for normal operational support, capacity planning, network design and traffic engineering generally increases. An MPLS network typically uses two primary types of routers, a Provider Edge (PE) router and a provider (P) router. The PE router receives IP traffic from/transmits traffic to a local area network (LAN) and transmits it to a wide area network (WAN). The PE router is typically configured to add one or more MPLS labels to the IP traffic header of a packet before the IP packet (traffic) is routed to the P routers. These MPLS labels support "label switched routing." The P router is configured to make routing decisions based on the MPLS label in the header of the packet to transmit the MPLS packet(s) across the WAN. When the packet arrives at the last P router (the Penultimate Hop Router) before the terminal PE router, i.e., is one hop away from the terminal PE router, the MPLS label is stripped from the header of the IP packet and the remaining IP packet is routed normally to the terminal PE router and ultimately to the final (or non-MPLS) destination.

Typically, network administrators generate matrices of traffic patterns between all PE routers. These matrices may be used to, for example, create new static label switched paths, evaluate the capacity of supporting transport links, forecast growth of traffic demands, support network models for design of new and revised networks, evaluate the effectiveness of quality of service (QoS) markings by examining the distribution of traffic as a function of MPLS EXP bits and the like.

Conventional methods use multi-protocol boundary gateway protocol (MP BGP) data to develop these matrices of traffic from one BGP PE to another. These methods may be successful in a homogeneous network, for example, where all the PE routers are supplied by a single vendor. Unfortunately, as discussed above, as the marketplace has grown, it is rare to find a single vendor PE network.

SUMMARY OF THE INVENTION

Some embodiments of the present invention provide methods, systems and computer program products for integrating data in a communications network received at provider (P) routers from provider edge (PE) routers having a plurality of different configurations. Global collection and export parameters for the P routers are configured. A collector associated with the P routers is configured to maintain a Netflow Exported Data Table for the P routers based on the global collection and export parameters received from the P routers. P router text files are configured. The P router text files identify all P routers associated with the collector using internet protocol (IP) addresses associated with each of the P routers. A destination PE router is located for a selected P router based on IP addresses in the P router text file associated with the selected P router such that the IP address of the selected P router is matched with the open shortest path first (OSPF) router identification of the destination PE router.

In further embodiments of the present invention, information associated with ones of a plurality of PE router to P router interfaces may be obtained to establish the global collection and export parameters for the P routers. The P routers may be configured to transmit multi-protocol label switching (MPLS) enabled data based on the established global collection and export parameters. IP route-cache flow may be enabled on the ones of the plurality of PE router to P router interfaces.

In still further embodiments of the present invention, key fields for EXP bits that define a class of service, a destination address of a destination PE router and an interface index of the P router may be created. Value fields for byte count, packet count and flow count may be enabled. The collector may be configured to call a user customized program so as to allow user customization of data records stored at the collector. The collector may be configured to configure an extensible markup language (XML) file to call a user supplied Perl program to act on data records upon completion of netflow records being written to a disk.

In some embodiments of the present invention, the P router text file may be a flat file including loopback addresses that identify the P router.

In further embodiments of the present invention, a destination PE router may be located for a selected P router based on IP addresses in the P router text file associated with the selected P router by determining all interface indexes for each of the P routers identified in the P router text file. An IP address and subnet mask pair may be identified for each of the determined interface indexes. IP addresses of all destination PE routers may be determined for each of the identified IP address and subnet mask pairs. All of the determined IP addresses of the destination PE routers may be connected to the selected P router to obtain the OSPF router identification. The OSPF router identifications of the destination PE routers may be stored in the Ifindex-PE router lookup table at the collector that keys the IfIndex of the P router interface to the OSPF router ID of the distal PE router. In certain embodiments, the stored OSPF router identifications may be updated periodically, for example, every 15 minutes. The interface index for each P router may be determined and the routers may be connected using simple network management protocol SNMP.

In still further embodiments of the present invention, reports may be generated including traffic flow information.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EXEMPLARY EMBODIMENTS

Figure 1:
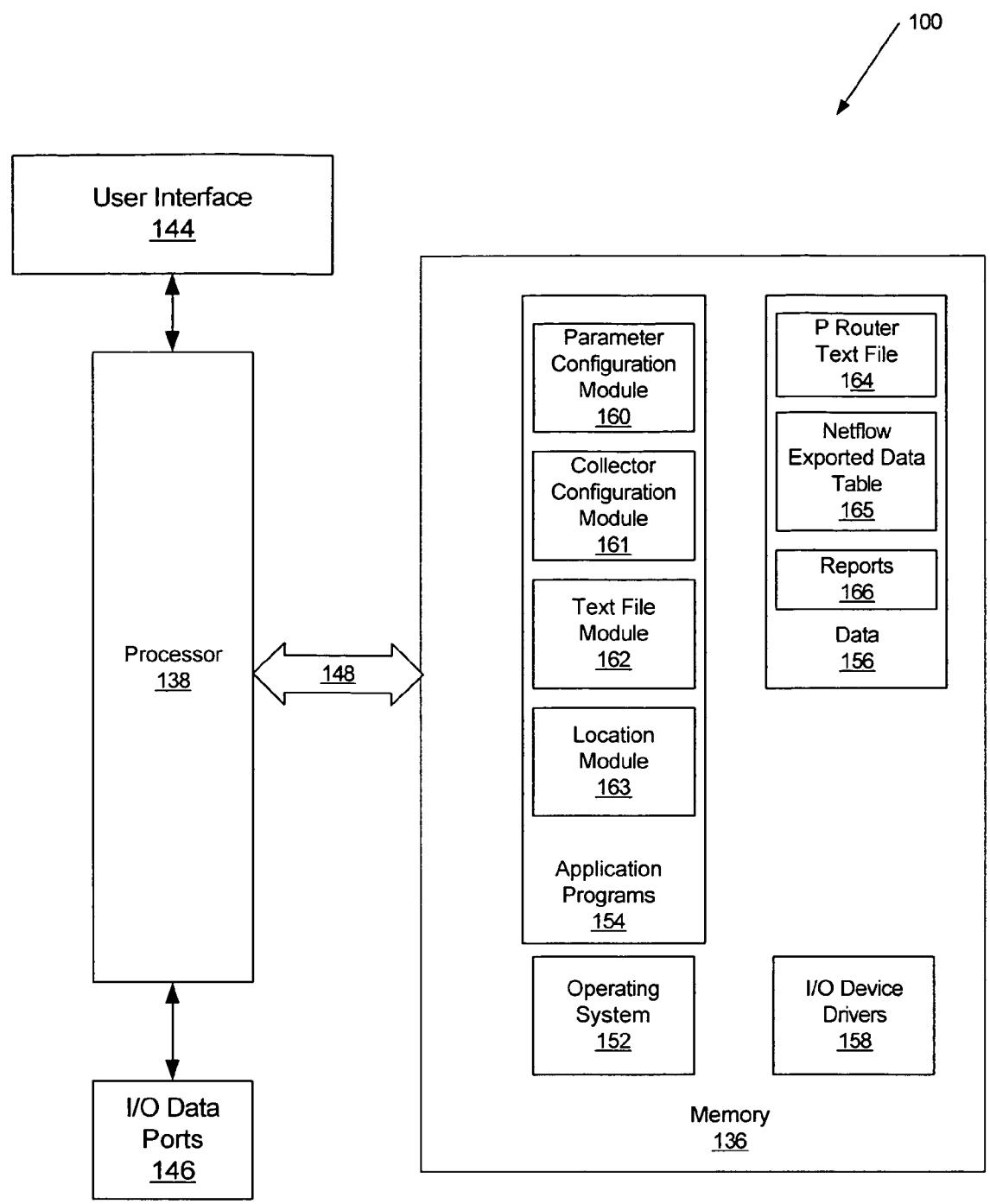
FIG. 1 is a block diagram of a hardware and software environment in which the present invention may operate according to some embodiments of the present invention.

The present invention now will be described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), and a portable compact disc read-only memory (CD-ROM).

The present invention is described below with reference to block diagrams and/or flowchart illustrations of devices, methods and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As discussed above, the ability to generate reports or develop matrices of traffic patterns between all PE routers is becoming more critical. These matrices may include information such as how much traffic is communicated between physical devices in the network. These matrices may be used, for example, to create new static label switched paths, evaluate the capacity of supporting transport links, forecast growth of traffic demands, support network models for design of new and revised networks, evaluate the effectiveness of quality of service (QoS) markings by examining the distribution of traffic as a function of MPLS EXP bits and the like.

Typically, multi-protocol boundary gateway protocol (MP BGP) data is used to develop these matrices of traffic from one BGP PE to another. These methods may be successful in a homogeneous network, for example, where all the PE routers are supplied by a single vendor. Unfortunately, as discussed above, as the marketplace has grown, it is rare to find a single vendor PE network. Companies, such as BellSouth, routinely use edge routers manufactured by multiple vendors. Thus, the much needed matrices may be difficult to generate.

In particular, the increasing demand for MPLS L3 VPN, triple play, IPTV, QoS, Fast Recovery, AS consolidation, and the like is driving the need for MPLS enabled networks. To support capacity planning and TE engineering access to information about the distribution of traffic from one PE router to another is important. With the rise of Redback, Juniper and Cisco the age of a single vendor network is past. Therefore, a need for a multi-vendor PE to PE traffic analysis solution is becoming more critical.

Accordingly, some embodiments of the present invention provide methods, systems and computer program products for integrating data in a communications network when the information is received at provider (P) routers form provider edge (PE) routers having multiple configurations, i.e., PE routers having different vendors and therefore most likely having different configurations. Thus, according to some embodiments of the present invention traffic information received from devices manufactured by different vendors may be integrated and used to accomplish the types of things discussed above. Methods, systems and computer program products according to some embodiments of the present invention may provide this integration by adding information to the P routers as will be discussed further herein with respect to FIGS. 1 through 5.

Although some embodiments of the present invention may be discussed herein with respect to networks including Cisco 10K and gigabit switched routers (GSR) and Juniper M160 and M320 routers, embodiments of the present invention are not limited to these exemplary routers. Any router that can be modified as discussed herein may be used in combination with the teachings discussed herein without departing from the scope of the present invention.

Embodiments of the present invention will now be discussed below with respect to FIGS. 1 through 5. Referring first to FIG. 1, a block diagram of a data processing system 100 that illustrates methods, systems and computer program products for integrating data in a communications network received at provider (P) routers from provider edge (PE) routers having a plurality of different configurations in accordance with some embodiments of the present invention will be discussed. More particularly, FIG. 1 illustrates features of embodiments of a P router (220 of FIG. 2), a PE router (200, 210 of FIG. 2) and/or collector (305 of FIG. 3), although it will be described primarily herein with reference to a single data processing system 100. Thus, it will be understood that the application programs 154 and/or data 156 discussed with respect to FIG. 1 could be included in one or more of the P router 220, PE router 200, 210 and collector 305 without departing from the scope of the present invention.

As illustrated in FIG. 1, the data processing system 100 typically includes a user interface 144, such as a keyboard, keypad, touchpad or the like, I/O data ports 146 and a memory 136 that communicate with a processor 138. The I/O data ports 146 can be used to transfer information between the data processing system 100 and another computer system or a network. These components may be conventional components, such as those used in many conventional data processing systems, which may be configured to operate as described herein.

As further illustrated in FIG. 1, the processor 138 communicates with the memory 136 via an address/data bus 148. The processor 138 can be any commercially available or custom microprocessor. The memory 136 is representative of the overall hierarchy of memory devices containing the software and data used to implement the functionality of the data processing system 100. The memory 136 can include, but is not limited to, the following types of devices: cache, ROM, PROM, EPROM, EEPROM, flash memory, SRAM, and DRAM.

As shown in FIG. 1, the memory 136 may include several categories of software and data used in the data processing system 100: an operating system 152; application programs 154; input/output (I/O) device drivers 158; and data 156. As will be appreciated by those of skill in the art, the operating system 152 may be any operating system suitable for use with a data processing system, such as OS/2, AIX or zOS from International Business Machines Corporation, Armonk, N.Y., Windows95, Windows98, Windows2000 or WindowsXP from Microsoft Corporation, Redmond, Wash., Unix or Linux. The I/O device drivers 158 typically include software routines accessed through the operating system 152 by the application programs 154 to communicate with devices such as the I/O data port(s) 146 and certain memory 136 components. The application programs 154 are illustrative of the programs that implement the various features of the data processing system 100 and preferably include at least one application that supports operations according to embodiments of the present invention. Finally, the data 156 represents the static and dynamic data used by the application programs 154, the operating system 152, the I/O device drivers 258, and other software programs that may reside in the memory 136.

As illustrated in FIG. 1, the data 156 according to some embodiments of the present invention may include one or more P router text files 164, one or more Netflow Exported Data Tables 165 and one or more reports 166. Embodiments of the present invention are not limited to the configuration of the data illustrated in FIG. 1, for example, any of the data can be combined without departing from the scope of the present invention. The details with respect to this data will be discussed further below.

In particular, although the term "netflow," which is specific to Cisco, is used herein to describe a specific Cisco configuration, embodiments of the present invention are not limited to Cisco specific embodiments. For example, the term "netflow" could be replaced by "CFLOW," which is specific to Juniper products, "SFLOW", "Flow" or the like without departing from the scope of the present invention. In other words, although "netflow" is a configuration specific to Cisco, flow based exports from a variety of vendors, for example, Juniper, may be used without departing from the scope of the present invention.

Although the data 156 only includes one of each type of file 164, 165 and 166, embodiments of the present invention are not limited to this configuration. Any number of any of these files may be provided without departing from the scope of the present invention.

As further illustrated in FIG. 1, the application programs 154 may include a parameter configuration module 160, a collector configuration module 161, a text file module 162 and a location module 163 according to some embodiments of the present invention. While the present invention is illustrated, for example, with reference to the parameter configuration module 160, the collector configuration module 161, the text file module 162 and the location module 163 being application programs in FIG. 1, as will be appreciated by those of skill in the art, other configurations may also be utilized while still benefiting from the teachings of the present invention. For example, the parameter configuration module 160, the collector configuration module 161, the text file module 162 and the location module 163 may also be incorporated into the operating system 152 or other such logical division of the data processing system 100. Thus, the present invention should not be construed as limited to the configuration of FIG. 1, but is intended to encompass any configuration capable of carrying out the operations described herein Furthermore, while the parameter configuration module 160, the collector configuration module 161, the text file module 162 and the location module 163 are illustrated in a single data processing system, as will be appreciated by those of skill in the art, such functionality may be distributed across one or more data processing systems. Thus, the present invention should not be construed as limited to the configuration illustrated in FIG. 1, but may be provided by other arrangements and/or divisions of function between data processing systems.

According to some embodiments of the present invention, the parameter configuration module 160 may be included in a P router 220 and the collector configuration module 161, the text file module 162 and location module 163 may be included in a collector 305 without departing from the scope of the present invention. Thus, some embodiments of the present invention will now be discussed with respect to FIG. 1, the block diagram of FIG. 2 and the flow diagram of FIG. 3.

Figure 2:
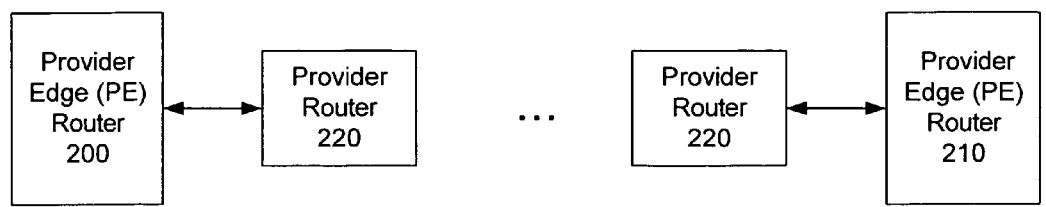
FIG. 2 is a block diagram illustrating edge routers and provider routers according to some embodiments of the present invention.

In particular, FIG. 2 is a block diagram illustrating PE routers 200, 210 and P routers 220 in accordance with some embodiments of the present invention. FIG. 2 is intended to illustrate that two PE routers 200, 210 manufactured by two different vendors may be connected through a network by one or more P routers 220. Although only two. P routers 220 are illustrated in FIG. 2, embodiments of the present invention are not limited to this configuration. One or more than two P routers may be included in the network without departing from the scope of the present invention.

Although not shown in FIG. 2, the PE routers 200, 210 connect to an external Internet Protocol (IP) network. As will be understood by those having skill in the art, the IP network may include a plurality of separate linked physical communication networks, which, using a protocol such as the IP, may appear to be a single seamless communications network to user application programs. It is further to be understood that the IP network may be comprised of one or a plurality of separate interconnected physical networks. The IP network may include one or more P routers 220 connecting the source PE router 200 to the destination PE router 210 without departing from the scope of the present invention.

Figure 3:
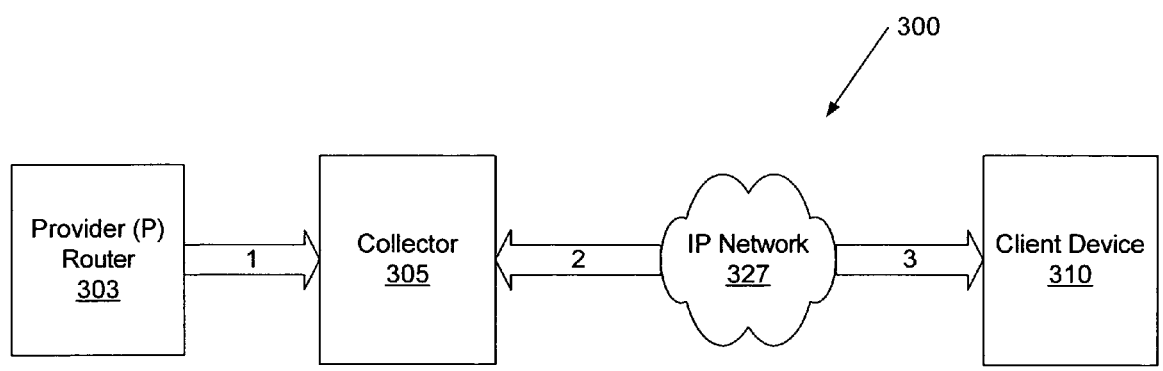
FIG. 3 is a data flow diagram illustrating data flows according to some embodiments of the present invention.

FIG. 3 is a flow diagram illustrating operations of the various application programs in accordance with some embodiments of the present invention. As discussed above, some embodiments of the present invention provide integration of traffic information from devices provided by different vendors by adding information to the P routers, for example, Cisco P routers. FIG. 3 illustrates operations according to embodiments of the present invention for adding this additional information.

Exemplary operations for adding this additional information to the P routers will now be discussed with respect to FIGS. 1, 2 and 3. The parameter configuration module 160 may be configured to set up global netflow collection parameters and export parameters for the P routers 220. As discussed above, the parameter configuration module 160 may be included in the P routers 220. In some embodiments of the present invention, the P routers may all be Cisco P routers, however, embodiments of the present invention are not limited to this configuration. In particular, the parameter configuration module 160 may be configured to export MPLS enabled netflow traffic. An example configuration template for this configuration is as follows:

```
config t

# enable flow sampling at 1 in 50 packets
ip flow-sampling-mode packet-interval 50
#enable mpls netflow for labels
ip flow-cache mpls label-positions 1 no-ip-fields mpls-length

#enable netflow ver 9 format collection
ip flow-export version 9
#enable the interface from which to export flows.
ip flow-export source loopback X
#enable the destination to which to send the exported flow information
where <X.X.X.X> is the ip address and <YYYY> is the udp port.
 ip flow-export destination <X.X.X.X> <YYYY>
exit

# Add netflow to interfaces in as specified
int <add interface information here>
Ip route-cache flow sampled
Exit
Wr mem
```

This configuration basically defines the information the P router should send/gather. It will be understood that this configuration is provided for exemplary purposes only and embodiments of the present invention are not limited to this configuration.

The parameter configuration module 160 may be further configured to enable ip route-cache flow sampled on selected PE router to P router interfaces. For example, information may be collected with respect to individual PE router to P router interfaces. It will be understood that according to some embodiments of the present invention, the ip route-cache flow should not be enabled on P router to P router interfaces. As illustrated in the data flow diagram of FIG. 3, once the global netflow collection parameters and export parameters are configured for the P routers 220, this information may be provided to the collector 305 (path 1).

The collector configuration module 161 may be configured to configure the collector 305. In some embodiments of the present invention, the collector may be, for example, a Cisco NFC collector. As discussed above, according to some embodiments of the present invention, the collector configuration module 161 may be included in the collector 305 without departing from the scope of the present invention. In particular, the collector configuration module 161 may be configured to create a key field for EXP bits, IP top layer LDP address (OSPF router identification) and input interface index (ifIndex). MPLS provides for different classes of service, i.e., different classes of traffic are treated differently, for example, some classes of traffic are given higher priority than others. The EXP bits in MPLS define the class of service for the traffic to which they are associated.

Furthermore, the IP top layer LDP address or OSPF router identification number defines where the traffic is going, i.e., identifies the destination PE router. The IfIndex defines the interface index for a P router for the P router to PE router interface. In some embodiments of the present invention, the null values should be enabled.

The collector configuration module 161 may be further configured to enable value fields for byte count, packet count and flow count. In particular, the byte count and packet count fields provide information with respect to how many bytes were sent and/or packets received over a predetermined period of time, for example, 15 minutes. The flow count field provides information with respect to how many flows came from the P router 220 to the collector 305 within a predetermined period of time, for example, 15 minutes. Although the time period of 15 minutes may be used throughout the specification, it will be understood that embodiments of the present invention are not limited to this configuration. Any time period may be used without departing from the scope of the present invention.

The collector configuration module 161 may be further configured to configure the collector to access a user supplied program to act on the data records upon completion of the data records being written to a disk. This may allow user customization of the configuration in accordance with some embodiments of the present invention.

In particular, an XML file, such as nfc-config.xml file, may be configured to call a user supplied Perl program, such as NFC_CONV.pl, to act on the NFC data records upon completion of the netflow records being written to disk. This process may be performed periodically to update the data records, for example, every 15 minutes per router. This example is provided for exemplary purposes only and it will be understood that embodiments of the present invention should not be limited by this example.

An exemplary collector configuration program may be as follows:

```
<?xml version="1.0" encoding="UTF-8" ?>
<nfc-config xmlns="http://www.cisco.com/nfc">
    <!--
        nfc-config.xml
        XML configuration file for NetFlow Collector
    -->
    <global />
    <key-builders>
        <!--
            To monitor IPV6 traffic instead of IPV4, uncomment these key builders,
            which override default definitions in nfc-config-predefined.xml.
            Note that to monitor both IPV4 and IPV6 with the same collector, separate
            IPV6 keys and agg schemes that reference them would have to be defined.
            <inetaddress-key id="srcaddr-key">
                <name>srcaddr</name>
                <field>IPV6_SRC_ADDR</field>
            </inetaddress-key>
            <inetaddress-key id="dstaddr-key">
                <name>dstaddr</name>
                <field>IPV6_DST_ADDR</field>
            </inetaddress-key>
            <integer-key id="src-mask-key">
                <name>src_mask</name>
                <field>IPV6_SRC_MASK</field>
            </integer-key>
            <integer-key id="dst-mask-key">
                <name>dst_mask</name>
                <field>IPV6_DST_MASK</field>
            </integer-key>
            <inetaddress-key id="nexthop-key">
                <name>nexthop</name>
                <field>IPV6_NEXT_HOP</field>
            </inetaddress-key>
        -->
        <inetaddress-key format="standard-notation"
                id="MPLS_IP_ADD_1" is-null-allowed="true">
            <field>MPLS_TOP_LABEL_IP_ADDR</field>
        </inetaddress-key>
        <bit-field-key format="decimal" id="exp-key" is-null-allowed="true">
            <name>EXP</name>
            <field>MPLS_LABEL_1</field>
            <least-significant-bit>1</least-significant-bit>
            <num-bits>3</num-bits>
        </bit-field-key>
    </key-builders>
    <filters />
    <aggregation-schemes>
        <aggregation-scheme id="stan">
            <keys>
                <key id="input-key" />
            </keys>
            <values>
                <value id="byte-count-value" />
                <value id="packet-count-value" />
                <value id="flow-count-value" />
            </values>
        </aggregation-scheme>
        <aggregation-scheme id="stan-mpls">
            <keys>
                <key id="input-key" />
                <key id="exp-key" />
                <key id="MPLS_IP_ADD_1" />
            </keys>
            <values>
                <value id="byte-count-value" />
                <value id="packet-count-value" />
                <value id="flow-count-value" />
            </values>
        </aggregation-scheme>
    </aggregation-schemes>
    <aggregators>
        <aggregator id="stan-mpls" is-output-sorted="true">
            <aggregation-scheme id="stan-mpls" />
            <period-minutes>15</period-minutes>
            <port protocol="udp">9995</port>
            <state>active</state>
            <writers>
                <ascii-writer output-base-dir="/export/home/netflow">
                    <use-compression>false</use-compression>
                    <max-disk-usage-megabytes>0</max-disk-usage-megabytes>
                    <output-postprocessors>
                        <output-postprocessor ignore-exit-status="false">/opt/CSCOnfc/skstools/NFC_CONV.pl</output-postprocessor>
                    </output-postprocessors>
                </ascii-writer>
            </writers>
        </aggregator>
    </aggregators>
    <nde-source-groups />
    <nde-source-access-list action="permit" />
    <option-data-map />
    <option-data-listeners>
        <option-data-writer>
            <output-period-minutes>2</output-period-minutes>
            <keep-latest-entries-only>true</keep-latest-entries-only>
        </option-data-writer>
    </option-data-listeners>
    <cns-xml-interface>
        <subject>cisco.mgmt.nfc.${hostname}</subject>
        <broadcast-subject>cisco.mgmt.nfc</broadcast-subject>
        <md5-password>password</md5-password>
    </cns-xml-interface>
    <disk-usage-monitor>
        <monitor clear-threshold="80"
            filesystem="/export/home/netflow" interval="2" warning-threshold="90" />
    </disk-usage-monitor>
    <!--
        <memory-monitor
            mem-check-period-mills="2000"
            suspend-packet-processing-mem-usage-percent="85"
            drop-queued-output-jobs-mem-usage-percent="95"
            resume-normal-operation-mem-usage-percent="75"
        />
    -->
</nfc-config>
```

The configuration program set out above is provided for exemplary purposes only and, therefore, embodiments of the present invention should not be limited to the steps set out therein. Furthermore, this configuration program instructs the collector 305 what to do with the acquired data.

The text file module 162 may be configured to configure P router text files 164 for each of the P routers 220. As discussed above, the text file module 162 may be included in the collector 305. The P router text files 164 may identify all P routers 220 associated with the collector 305 using IP addresses associated with each of the P routers. In other words, the P router text files 164 indicate which P routers to communicate with. A P router text file 164 according to some embodiments of the present invention may include, for example, 44 unique IP addresses as follows:

205.152.XXX.YYY
205.152.XXX.YYY
209.149.XXX.YYY
209.149.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
207.203.XXX.YYY
207.203.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY
205.152.XXX.YYY

In some embodiments of the present invention, the P router text file 164 may be a simple flat file with the Loopback address that identifies the P router. However, it will be understood that embodiments of the present invention are not limited to this configuration. Once the P router text file 164 is configured it may be stored on the collector in a directory, for example, /opt/CSCOnfc/skstools.

The location module 163 may be configured to determine a PE router 200, 210 for each selected P router 220. This may be a separate program, for example, OSPF_review.pl, without departing from the present invention. In some embodiments of the present invention, the program may be a Perl program. The location module 163 may be included in the collector 305 without departing from the scope of the present invention.

The program run by the location module 163 may read the P_routers.txt file. Again, the P router text file is a list of all P routers 220 feeding netflow data to the collector 305. All interfaces (IfIndexes) are located for each P router using, for example, simple network management protocol (SNMP). For each Ifindex, the IP address and the subnet mask pair for that IP address is located. For each IP address and subnet mask pair, the corresponding IP address for the distal PE router is located/determined. Then, each PE router IP address is connected to the P router using, for example, SNMP. This connection may be made to obtain information, for example, the OSPF router ID. The OSPF router ID (source router LDP address) may be recorded at the PE router. Using the acquired information, a hash, for example, a Perl hash (a small database) may be created for each P router Ifindex matching the P router Ifindex with the PE router OSPF Router ID. Once the program (OSPF-review.pl) is complete, the results may be stored at the collector in directory /opt/CSCOnfc/skstools.

At this point another program, for example, NFC_CON-V.pl, may be called to convert NFC records to the proper format. The results may be stored/written at the collector 305. For example, the results may be stored in /export/home/netflow/stan-mpls/#date/$router_address/stan-mpls/. In other words, the Netflow Exported Data Table 165 may be set up and/or updated with the acquired information.

As illustrated in the flow diagram of FIG. 3, the collector 305 communicates with a client device 310 over the IP network 327 (flows 2 and 3). The client device may be used to run reports 166 to obtain information on traffic distribution, flow and the like. For example, the client device 310 may use an NFC web based reporting tool to generate custom reports on traffic distribution in accordance with some embodiments of the present invention. Using the P routers having access to additional information according to some embodiments of the present invention may make it possible to obtain accurate information about the distribution of traffic from one PE router to another even when the PE routers are provided by different vendors.

Figure 4:
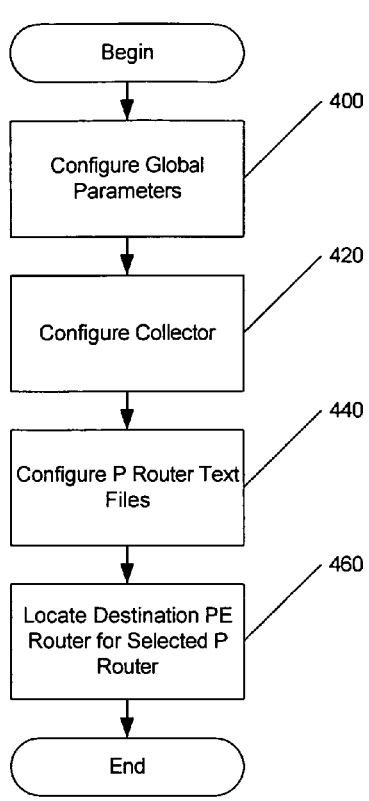
FIGS. 4 and 5 are flowcharts illustrating operations according to various embodiments of the present invention.
Figure 5:
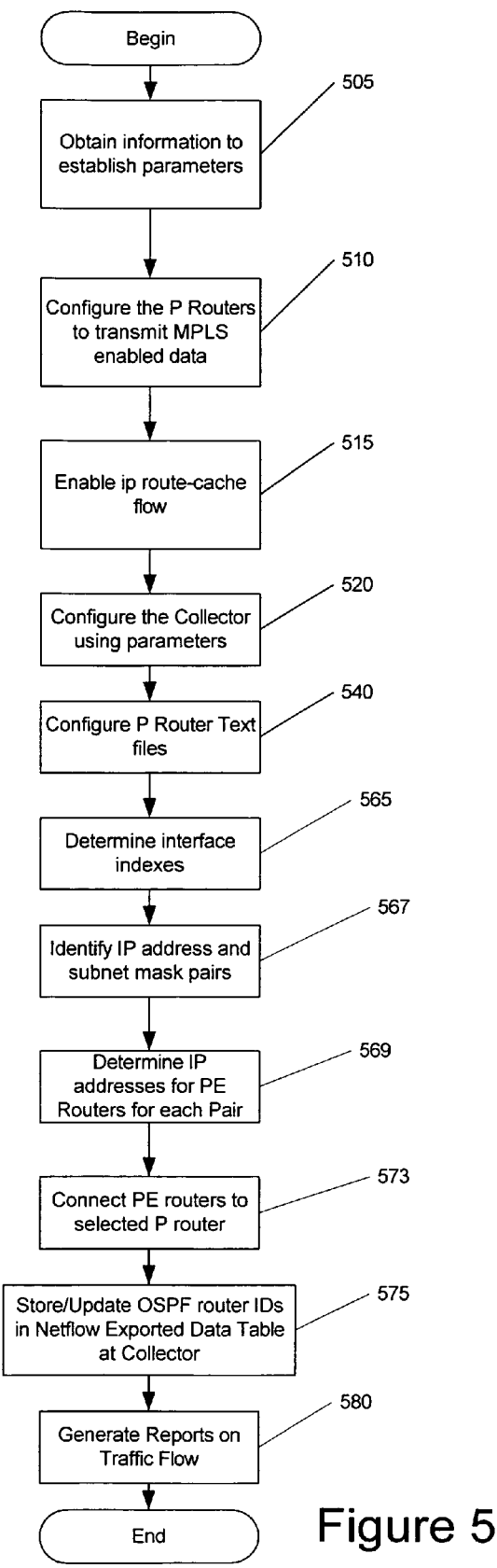

Operations for integrating data in a communications network received at P routers from PE routers having a plurality of different configurations according to various embodiments of the present invention will now be discussed with respect to the flowcharts of FIGS. 4 and 5. Referring first to FIG. 4, operations begin at block 400 by configuring global collection and export parameters for the P routers. The collector associated with the P routers is configured to maintain a flow export data table for the P routers based on the global collection and export parameters received from the P routers (block 420). P router text files are configured (block 440). As discussed above. The P router text files identify all P routers associated with the collector using IP addresses associated with each of the P routers. A destination PE router may be located for a selected P router based on in the P router text file associated with the selected P router such that all of the IfIndexies of the selected P router is matched with the open shortest path first (OSPF) router identification of the destination PE router (block 460).

Operations according to further embodiments of the present invention will now be discussed with respect to the flowchart of FIG. 5. As illustrated therein, operations may begin at block 505 by obtaining information associated with ones of a plurality of PE router to P router interfaces to establish the global collection and export parameters for the P routers. The P routers may be configured to transmit multi-protocol label switching (MPLS) enabled data based on the established global collection and export parameters (block 510). Ip route-cache flow may be on the ones of the plurality of PE router to P router interfaces (block 515).

The collector may be configured (block 520). In some embodiments of the present invention, configuring the collector may include creating key fields for EXP bits that define a class of service, a destination address of a destination PE router and an interface index of the P router. Furthermore, value fields may be enabled for byte count, packet count and flow count. Finally, the collector may be configured to call a user customized program so as to allow user customization of data records stored at the collector.

In some embodiments of the present invention, the collector may be configured to run an XML file configured to call a user supplied Perl program to act on data records upon completion of netflow records being written to a disk.

The P router text files may be configured (block 540). In some embodiments of the present invention, the P router text file may be a flat file including loopback addresses that identify the P router as discussed above with respect to FIGS. 1 through 3.

All interface indexes (IfInexies) for each of the P routers identified in the P router text file may be determined (block 565). An IP address and subnet mask pair for each of the determined interface indexes may be identified (block 567). IP addresses of all destination PE routers for each of the identified IP address and subnet mask pairs may be determined (block 569). All of the determined IP addresses of the destination PE routers may be connected to the selected P router to obtain the OSPF router identification (block 573). In some embodiments of the present invention, the interface index for each P router may be determined and the routers may be connected using SNMP.

The OSPF router identification of the destination PE routers may be stored in the Ifindex-PE router lookup table at the collector (block 575). In some embodiments of the present invention, the stored OSPF router identifications of the destination PE routers may be periodically updated, for example, every 15 minutes (block 575). Once all the information is collected and stored/updated, reports including traffic flow information may be generated (block 580).

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method of integrating data in a communications network received at provider (P) routers from provider edge (PE) routers having a plurality of different configurations, comprising:
   configuring global collection and export parameters for the P routers;
   configuring a collector associated with the P routers to maintain a netflow exported data table for the P routers based on the global collection and the export parameters received from the P routers;
   configuring P router text files, the P router text files identifying all P routers associated with the collector using internet protocol (IP) addresses associated with each of the P routers; and
   locating destination PE routers for a selected P router based on the IP addresses in a P router text file associated with a selected P router input interface index (IfIndex) such that the IP address of a selected P router interface is matched with an open shortest path first (OSPF) router identification of a destination PE router,
   wherein configuring the collector comprises:
   creating key fields for export (EXP) bits that define a class of service, a destination address of the destination PE router and an interface index of the P router;
   enabling value fields for byte count, packet count and flow count; and
   configuring the collector to call a user customized program so as to allow user customization of data records stored at the collector.

2. The method of claim 1, wherein configuring the global collection and the export parameters for the P routers comprises:
   obtaining information associated with ones of a plurality of PE routers to P router interfaces to establish the global collection and the export parameters for the P routers;
   configuring the P routers to transmit multi-protocol label switching (MPLS) enabled data based on the established global collection and the export parameters; and
   enabling internet protocol (ip) route-cache flow on the ones of the plurality of PE routers to the P router interfaces.

3. The method of claim 1, wherein configuring the collector to call the user customized program comprises configuring an XML file to call a user supplied Perl program to act on the data records upon completion of netflow records being written to a disk.

4. The method of claim 1, wherein the P router text file comprises a flat file including loopback addresses that identify the P router.

5. The method of claim 1, wherein locating the destination PE router for the selected P router based on the IP addresses in the P router text file associated with the selected P router comprises:
   determining all interface indexes for each of the P routers identified in the P router text file;
   identifying an IP address and subnet mask pair for each of the determined interface indexes;
   determining IP addresses of all destination PE routers for each of the identified IP address and subnet mask pairs;
   connecting all of the determined IP addresses of the destination PE routers to the selected P router to obtain the OSPF router identification; and
   storing the OSPF router identifications of the destination PE routers in an Ifindex-lookup table at the collector.

6. The method of claim 5, further comprising periodically updating the stored OSPF router identifications of the destination PE routers.

7. The method of claim 5, wherein determining comprises determining an interface index for each P router using simple network management protocol (SNMP) and wherein connecting comprises connecting via the SNMP.

8. The method of claim 7, further comprising generating reports including traffic flow information.

9. A computer program product for integrating data in a communications network received at provider (P) routers from provider edge (PE) routers having a plurality of different configurations, the computer program product comprising computer program code embodied in a non-transitory, tangible computer readable storage medium, the computer program code comprising program code configured to carry out the method of claim 1.

10. A computer program product for integrating data in a communications network received at provider (P) routers from provider edge (PE) routers having a plurality of different configurations, the computer program product comprising:

a non-transitory, tangible computer-readable storage medium having computer-readable program code embodied in said medium, said computer-readable program code comprising:
computer readable program code configured to configure global collection and export parameters for the P routers;
computer readable program code configured to configure a collector associated with the P routers to maintain a Netflow Exported Data Table for the P routers based on the global collection and the export parameters received from the P routers;
computer readable program code configured to configure P router text files, the P router text files identifying all P routers associated with the collector using internet protocol (IP) addresses associated with each of the P routers; and
computer readable program code configured to locate a destination PE router for a selected P router based on IP addresses in a P router text file associated with a selected P router interface such that the IP address of the selected P router interface is matched with an open shortest path first (OSPF) router identification of the destination PE router,
wherein the computer readable program code configured to configure the collector comprises:
computer readable program code configured to create key fields for export (EXP) bits that define a class of service, a destination address of the destination PE router and an interface index of the P router;
computer readable program code configured to enable value fields for byte count, packet count and flow count; and
computer readable program code configured to configure the collector to call a user customized program so as to allow user customization of data records stored at the collector.

11. The computer program product of claim 10, wherein the computer readable program code configured to the configure collection and the export parameters for the P routers comprises:
computer readable program code configured to obtain information associated with ones of a plurality of PE routers to P router interfaces to establish the global collection and the export parameters for the P routers;
computer readable program code configured to configure the P routers to transmit multi-protocol label switching (MPLS) enabled data based on the established global collection and the export parameters; and
computer readable program code configured to enable IP route-cache flow on the ones of the plurality of PE routers to the P router interfaces.

12. The computer program product of claim 10, wherein the computer readable program code configured to locate a destination PE router for a selected P router based on the IP addresses in the P router text file associated with the selected P router comprises:
computer readable program code configured to determine all interface indexes for each of the P routers identified in the P router text file;
computer readable program code configured to identify an IP address and subnet mask pair for each of the determined interface indexes;
computer readable program code configured to determine the IP addresses of all destination PE routers for each of the identified IP address and subnet mask pairs;
computer readable program code configured to connect all of the determined IP addresses of the destination PE routers to the selected P router to obtain an OSPF router identification; and
computer readable program code configured to store the OSPF router identifications of the destination PE routers in the Netflow Exported Data Table at the collector.

* * * * *